United States Patent
Zagaynov et al.

(10) Patent No.: US 10,872,271 B2
(45) Date of Patent: Dec. 22, 2020

(54) TRAINING IMAGE-PROCESSING NEURAL NETWORKS BY SYNTHETIC PHOTOREALISTIC INDICIA-BEARING IMAGES

(71) Applicant: ABBYY Production LLC, Moscow (RU)

(72) Inventors: Ivan Germanovich Zagaynov, Dolgoprudniy (RU); Pavel Valeryevich Borin, Tomsk (RU)

(73) Assignee: ABBYY PRODUCTION LLC, Moscow (RU)

( * ) Notice: Subject to any disclaimer, the term of this patent is extended or adjusted under 35 U.S.C. 154(b) by 134 days.

(21) Appl. No.: 16/137,981

(22) Filed: Sep. 21, 2018

(65) Prior Publication Data

US 2020/0089998 A1    Mar. 19, 2020

(30) Foreign Application Priority Data

Sep. 19, 2018   (RU) ................................ 2018133155

(51) Int. Cl.
   *G06K 9/62*   (2006.01)
   *G06K 9/54*   (2006.01)
   (Continued)

(52) U.S. Cl.
   CPC ............. *G06K 9/6257* (2013.01); *G06K 9/54* (2013.01); *G06K 9/628* (2013.01); *G06N 3/04* (2013.01);
   (Continued)

(58) Field of Classification Search
   CPC ........ G06K 9/6257; G06K 9/54; G06K 9/628; G06K 2209/01; G06N 3/04; G06N 3/08;
   (Continued)

(56) References Cited

U.S. PATENT DOCUMENTS

| 6,760,299 B1 * | 7/2004 | Nakajima | G11B 7/005 369/275.4 |
| 2009/0067726 A1 | 3/2009 | Erol et al. | |

(Continued)

FOREIGN PATENT DOCUMENTS

CN    103761710    4/2014

OTHER PUBLICATIONS

Pai, Prasad, "Adding Salt and Pepper noise", https://medium.com/ymedialabs-innovation/data-augmentation-techniques-in-cnn-using-tensorflow-371ae43d5be9, Oct. 25, 2017, 12 pages.

(Continued)

Primary Examiner — Jerome Grant, II
(74) Attorney, Agent, or Firm — Lowenstein Sandler LLP (57) ABSTRACT

Systems and methods for training image processing neural networks by synthetic photorealistic indicia-bearing images. An example method comprises: generating an initial set of images, wherein each image of the initial set of images comprises a rendering of a text string; producing an augmented set of images by processing the initial set of images to introduce, into each image of the initial set of image, at least one simulated image defect; generating a training dataset comprising a plurality of pairs of images, wherein each pair of images comprises a first image selected from the initial set of images and a second image selected from the augmented set of images; and training, using the training dataset, a convolutional neural network for image processing.

17 Claims, 10 Drawing Sheets

(51) Int. Cl.
*G06N 3/04* (2006.01)
*G06N 3/08* (2006.01)
*G06T 3/40* (2006.01)
*G06T 5/00* (2006.01)
*G06T 5/30* (2006.01)
*G06T 5/50* (2006.01)
*G06T 11/60* (2006.01)

(52) U.S. Cl.
CPC .............. *G06N 3/08* (2013.01); *G06T 3/40* (2013.01); *G06T 5/002* (2013.01); *G06T 5/007* (2013.01); *G06T 5/30* (2013.01); *G06T 5/50* (2013.01); *G06T 11/60* (2013.01); *G06K 2209/01* (2013.01); *G06T 5/004* (2013.01); *G06T 2207/20024* (2013.01); *G06T 2207/20081* (2013.01); *G06T 2207/20084* (2013.01); *G06T 2207/20212* (2013.01)

(58) Field of Classification Search
CPC  G06T 3/40; G06T 5/002; G06T 5/007; G06T 5/30; G06T 5/50; G06T 11/60; G06T 5/004; G06T 2207/20024; G06T 2207/20081; G06T 2207/20084
USPC ......................................................... 382/157
See application file for complete search history.

(56) References Cited

U.S. PATENT DOCUMENTS

| | | | |
|---|---|---|---|
| 2009/0070110 A1 | 3/2009 | Erol et al. | |
| 2009/0074300 A1 | 3/2009 | Hull et al. | |
| 2011/0013847 A1* | 1/2011 | Statsenko | G06K 9/00456 382/224 |
| 2011/0310110 A1 | 12/2011 | Lookingbill et al. | |
| 2015/0095781 A1* | 4/2015 | Park | H04N 21/422 715/719 |
| 2015/0178591 A1* | 6/2015 | Fergus | G06T 5/005 382/157 |
| 2015/0379422 A1 | 12/2015 | Chandler | |
| 2016/0350900 A1 | 12/2016 | Barron | |
| 2018/0129929 A1* | 5/2018 | Shigenaka | G06N 3/0454 |
| 2018/0137605 A1* | 5/2018 | Otsuka | G06T 5/002 |
| 2018/0197278 A1* | 7/2018 | Lee | G06T 5/20 |
| 2019/0005035 A1* | 1/2019 | Yamazaki | G06N 3/063 |
| 2019/0355102 A1* | 11/2019 | Lin | G06T 11/00 |
| 2019/0385013 A1* | 12/2019 | Balan | G06N 3/08 |
| 2020/0065619 A1* | 2/2020 | Liu | G06N 3/08 |
| 2020/0065940 A1* | 2/2020 | Tang | G06T 5/002 |
| 2020/0082218 A1* | 3/2020 | Hoehne | G06N 3/08 |
| 2020/0085290 A1* | 3/2020 | Wang | G06N 20/20 |

OTHER PUBLICATIONS

Dodge, Samuel, Arizona State University, "Understanding How Image Quality Affects Deep Neural Networks", https://arxiv.org/pdf/1604.04004.pdf, Apr. 21, 2016, 6 pages.

Acharya, Tinku, et al, "Image Processing Principles and Applications", http://www.cs.ukzn.ac.za/~sviriri/Books/Image-Processing/book4.pdf, 2005, 451 pages.

Yu, Fisher, "Multi-Scale Context Aggregation by Dilated Convolutions", https://arxiv.org/pdf/1511.07122.pdf, Apr. 30, 2016, 13 pages.

* cited by examiner

TRAINING IMAGE-PROCESSING NEURAL NETWORKS BY SYNTHETIC PHOTOREALISTIC INDICIA-BEARING IMAGES

REFERENCE TO RELATED APPLICATIONS

The present application claims the benefit of priority under 35 U.S.C. § 119 to Russian Patent Application No. 2018133155 filed Sep. 19, 2018, the disclosure of which is incorporated by reference herein.

TECHNICAL FIELD

The present disclosure is generally related to computer systems, and is more specifically related to systems and methods for training image-processing neural networks by synthetic photorealistic indicia-bearing images.

BACKGROUND

Optical character recognition (OCR) process may extract computer-readable and searchable textual information from indicia-bearing images of various media (such as printed or handwritten paper documents, banners, posters, signs, billboards, and/or other physical objects bearing visible text symbols (including encoded text symbols, such as barcodes) on one or more of their surfaces). Before being fed to an OCR process, input images may be pre-processed by one or more convolutional neural networks which correct certain image defects.

SUMMARY OF THE DISCLOSURE

In accordance with one or more aspects of the present disclosure, an example method of training image processing neural networks by synthetic photorealistic indicia-bearing images may comprise: generating an initial set of images, wherein each image of the initial set of images comprises a rendering of a text string; producing an augmented set of images by processing the initial set of images to introduce, into each image of the initial set of image, at least one simulated image defect; generating a training dataset comprising a plurality of pairs of images, wherein each pair of images comprises a first image selected from the initial set of images and a second image selected from the augmented set of images; and training, using the training dataset, a convolutional neural network for image processing.

In accordance with one or more aspects of the present disclosure, an example system for training image processing neural networks by synthetic photorealistic indicia-bearing images may comprise: a memory; a processing device, coupled to the memory, the processing device configured to: generate an initial set of images, wherein each image of the initial set of images comprises a rendering of a text string; produce an augmented set of images by processing the initial set of images to introduce, into each image of the initial set of image, at least one simulated image defect; generate a training dataset comprising a plurality of pairs of images, wherein each pair of images comprises a first image selected from the initial set of images and a second image selected from the augmented set of images; and train, using the training dataset, a convolutional neural network for image processing.

In accordance with one or more aspects of the present disclosure, an example computer-readable non-transitory storage medium may comprise executable instructions that, when executed by a processing device, cause the processing device to: generate an initial set of images, wherein each image of the initial set of images comprises a rendering of a text string; produce an augmented set of images by processing the initial set of images to introduce, into each image of the initial set of image, at least one simulated image defect; generate a training dataset comprising a plurality of pairs of images, wherein each pair of images comprises a first image selected from the initial set of images and a second image selected from the augmented set of images; and train, using the training dataset, a convolutional neural network for image processing.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for training image-processing neural networks using datasets of synthetic photorealistic indicia-bearing images.

Efficient training of image processing neural networks may be hindered by scarcity of available training datasets. Conversely, producing large training datasets which would include images taken under various conditions (such as different orientation, location, scale, brightness etc.) thus demonstrating a variety of image imperfections (defocusing, blur, glare, etc.) may be an expensive and/or time-consuming process. Image augmentation, i.e., modifying a set previously acquired images to change their orientation, location, scale, brightness, may in some situations alleviate the issue of training data scarcity, however, would still involve the costly process of acquiring the initial set of images.

The systems and methods described herein represent significant improvements over common image augmentation methods, by providing a method for generating photorealistic images which involves emulating the image acquisition process by rendering images of textual strings and subsequent processing of the generated images in order to introduce various imperfections and/or distortions (defocusing, blur, glare, etc.) which are usually found in photographically acquired images. Utilizing the synthetic photorealistic images produced by the systems and methods of the present disclosure for training image processing neural networks results in significant improvements in the image quality, thus improving the overall efficiency of various applications consuming the pre-processed images, such as an optical character recognition (OCR) process which extracts textual information from the images.

Figure 1:
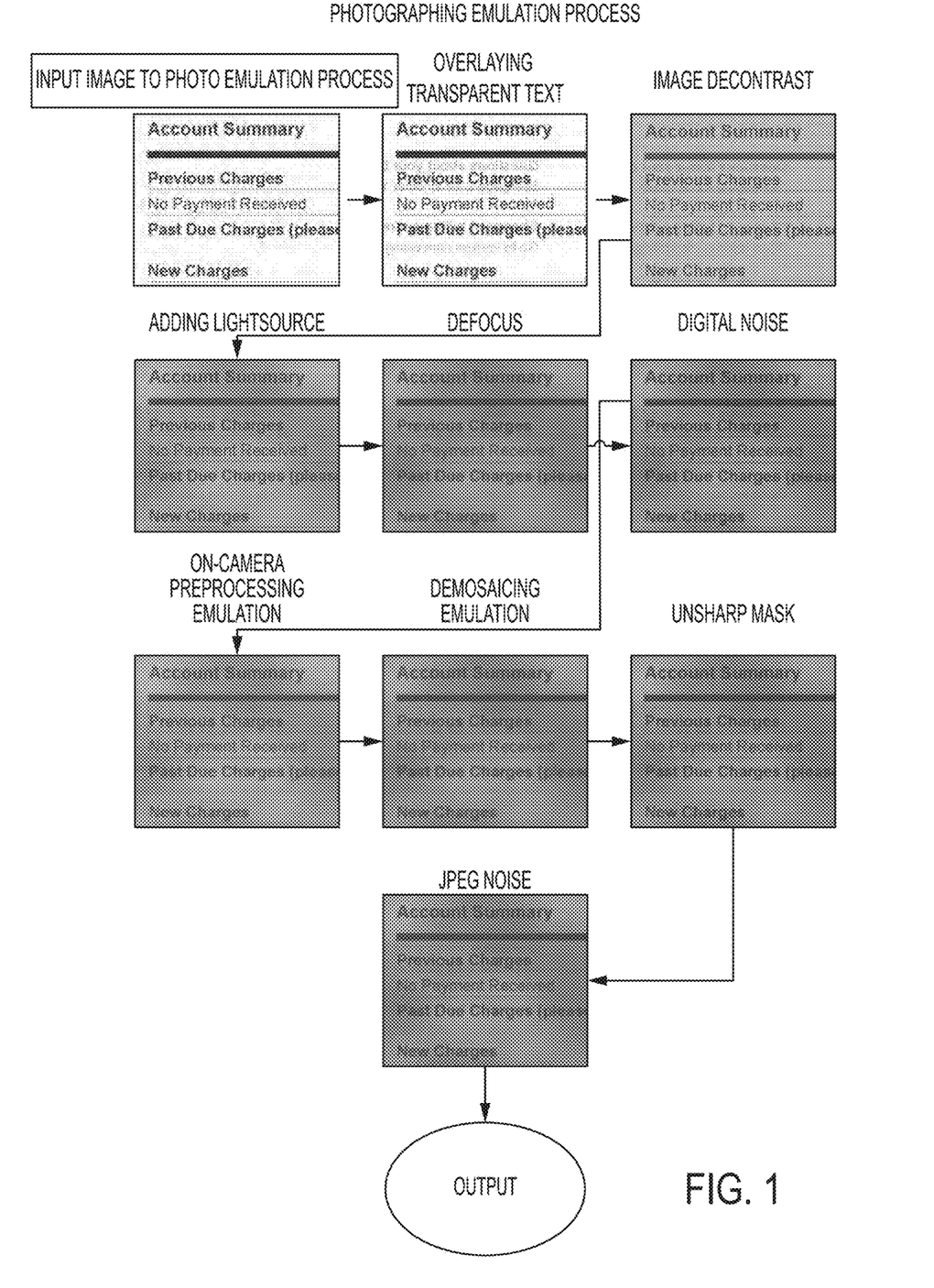
FIG. 1 depicts an example photography emulation process implemented in accordance with one or more aspects of the present disclosure.

In an illustrative example, a computer system implementing the methods described herein may perform the photography emulation process, as schematically illustrated by FIG. 1. The photography emulation process may involve overlaying a transparent text over the input image, deconstructing the image, emulating an additional source at the imaged scene, defocusing the image, introducing digital noise, emulating pre-processing the image by the image acquiring device (e.g., photo camera), emulating image de-mosaicing, applying an unsharp mask to the image, introducing JPEG noise into the image, and/or performing various other image processing operations. These image processing operations would yield an augmented set of images of indicia-bearing objects. Pairs of images, in which one image is drawn from the initial set of images and another image is drawn from the augmented set of images, may be utilized for subsequent training of convolutional neural networks employed for correcting various image defects, such as image blur, performing shadow and highlight enhancement, and/or various other image processing operations. The images processed by the trained neural networks may be subjected to the OCR process which extracts textual information from the images.

In certain implementations, convolutional neural networks which are utilized for image pre-processing may be modified and employed for classifying a set of input images in order to segregate synthetic images from real photographic images, as described in more detail herein below. Various aspects of the above referenced methods and systems are described in details herein below by way of examples, rather than by way of limitation.

Figure 2:
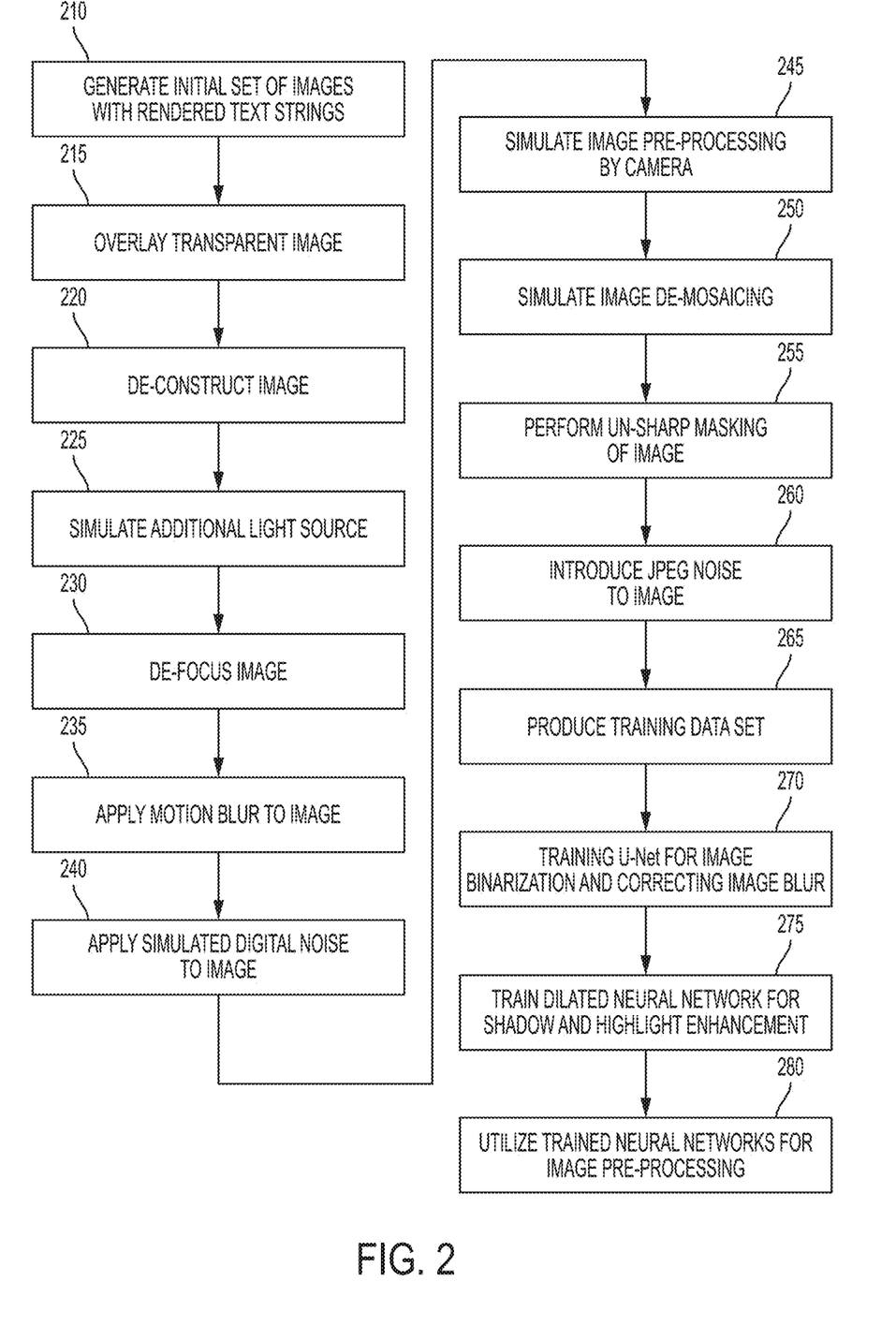
FIG. 2 depicts a flow diagram of an example method of training image-processing neural networks by synthetic photorealistic indicia-bearing images, in accordance with one or more aspects of the present disclosure.

FIG. 2 depicts a flow diagram of one illustrative example of a method 200 of training image processing neural networks by synthetic photorealistic indicia-bearing images, in accordance with one or more aspects of the present disclosure. Method 200 and/or each of its individual functions, routines, subroutines, or operations may be performed by one or more processors of the computer system (e.g., example computer system 800 of FIG. 8) executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other. Therefore, while FIG. 2 and the associated description lists the operations of method 200 in certain order, various implementations of the method may perform at least some of the described operations in parallel and/or in arbitrary selected orders.

At block 210, the computer system implementing the method may generate an initial set of images, such that each image would include renderings of one or more textual strings. The renderings may be performed using various fonts, resolutions, and/or other rendering process parameters. In an illustrative example, the initial set of images may only include black and white images. In an illustrative example, the initial set of images may be stored in one or more files of a pre-defined format, such as PDF files. In certain implementations, the neural networks trained by the methods of the present disclosure may be tested by utilizing validation sets of images containing known texts, which may be rendered and rasterized using pre-defined or dynamically adjustable rendering and rasterization parameters.

At blocks 215-260, the computer system may process the generated images in order to produce an augmented image set. The image processing may introduce various imperfections and/or distortions (defocusing, blur, glare, etc.), which are usually found in photographically acquired images. In various implementations, at least some of the operations described herein below with references to blocks 215-260 may be omitted; furthermore, the order of the image processing operations described herein below with references to blocks 215-260 may be varied.

Figure 3A:
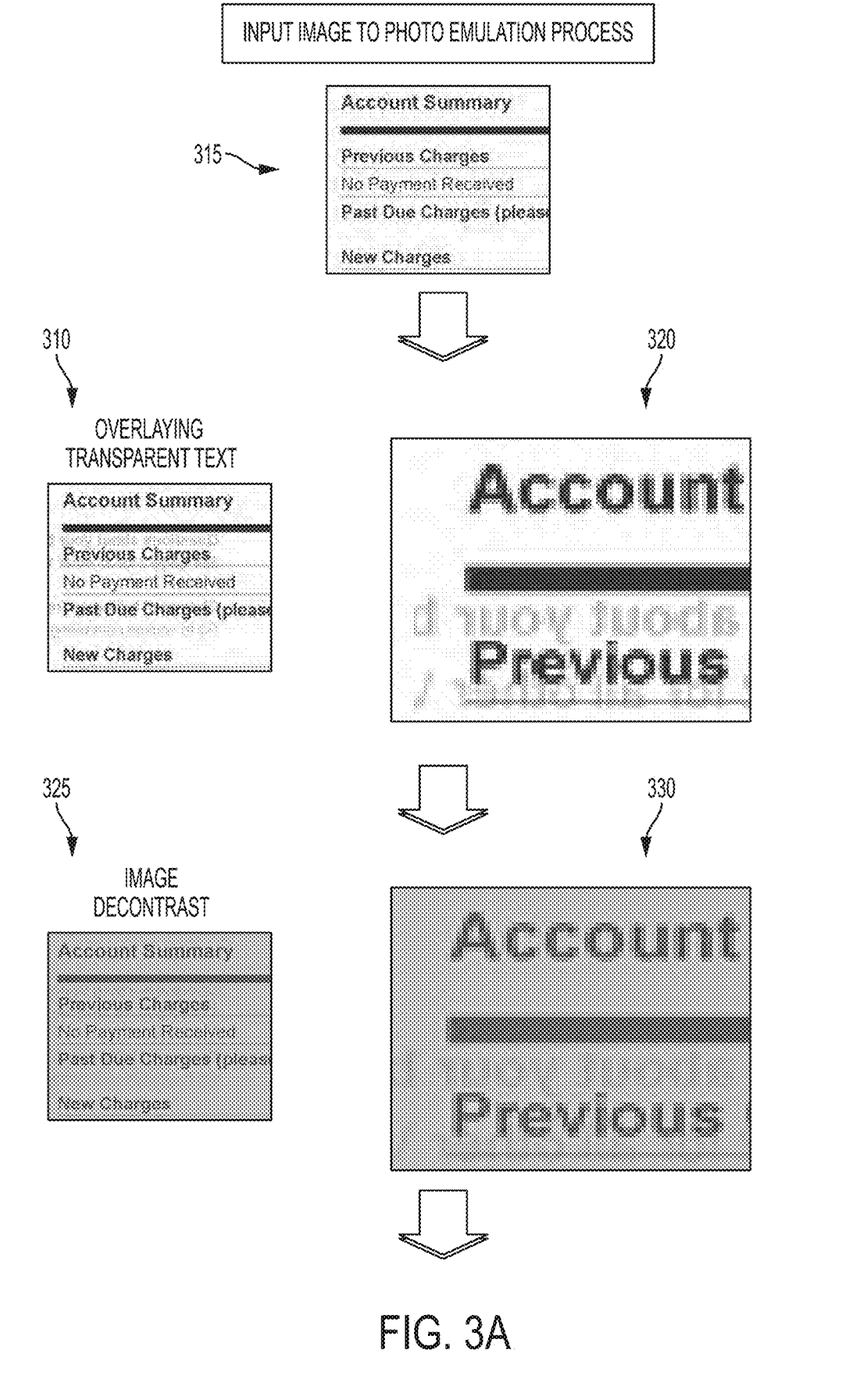
FIGS. 3A-3D schematically illustrate various image processing operations which may be employed for generating photorealistic indicia-bearing images, in accordance with one or more aspects of the present disclosure.

In particular, at block 215, the computer system may superimpose, on a generated image, a transparent image of a pre-defined or randomly generated text. Parts of the transparent image may be completely invisible within the fragments where the transparent image intersects with the base image ("full transparency"). Alternatively, parts of the transparent image may be partially visible within the fragments where the transparent image intersects with the base image ("partial transparency" or "translucency"). As schematically illustrated by FIG. 3A, operation 310 of overlaying a transparent text over the source image 315 produces the output image 320.

At block 220, the computer system may de-contrast a generated image, i.e., reduce the maximum difference in the luminance or brightness of the generated image pixels by a pre-defined value, e.g., 0.1 or 0.2 of the initial maximum difference. As schematically illustrated by FIG. 3A, operation 325 of de-contrasts the source image 320 thus producing the output image 330.

Figure 3B:
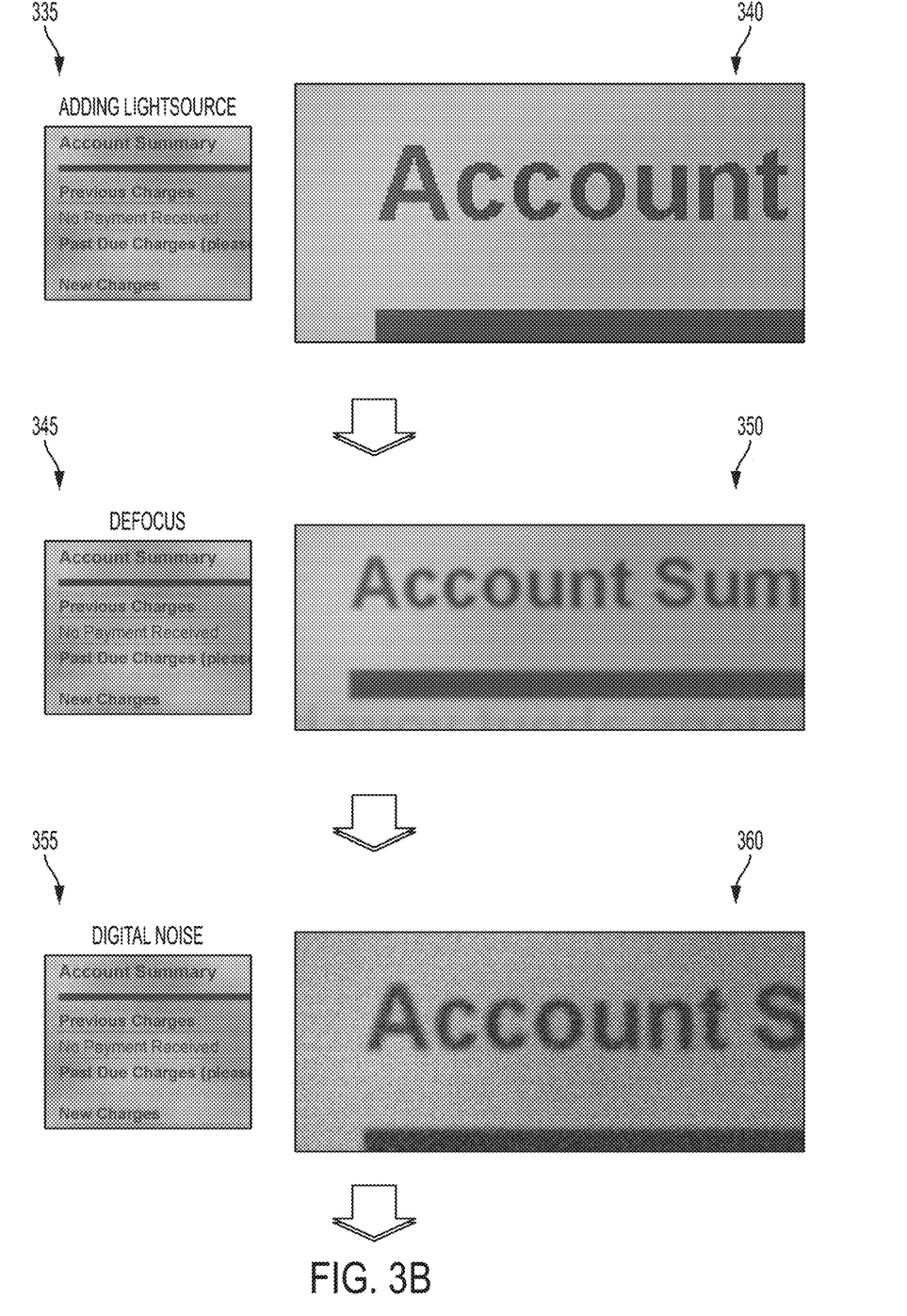

At block 225, the computer system may simulate an additional light source in the imaged scene, by additively applying, to at least a subset of the image pixels, extra-low frequency Gaussian noise of a low amplitude, thus emulating gradient transitions between lighter and darker image fragments. As schematically illustrated by FIGS. 3A-3B, operation 335 of simulating an additional light source in the imaged scene would process the input image 330 and produce the output image 340.

At block 230, the computer system may at least partially de-focus the image, e.g., by applying Gaussian blur with a pre-defined or dynamically adjustable radius, which may be selected from a pre-defined or dynamically adjustable the range (e.g., 0.7-3.0). As schematically illustrated by FIG. 3B, operation 345 of de-focusing the input image 340 produces the output image 350.

At block 235, the computer system may superimpose a motion blur on the image, thus simulating movement of the imaged objects within the exposure period determined by the shutter speed.

At block 240, the computer system may apply, to at least a subset of the image pixels, a simulated digital noise, such as Gaussian noise of a pre-defined or dynamically-adjustable amplitude, e.g., not exceeding 20 units of the image brightness, or not exceeding 0.15 of the image brightness range. As schematically illustrated by FIG. 3B, operation 355 of introducing digital noise into the input image 350 produces the output image 360.

Figure 3C:
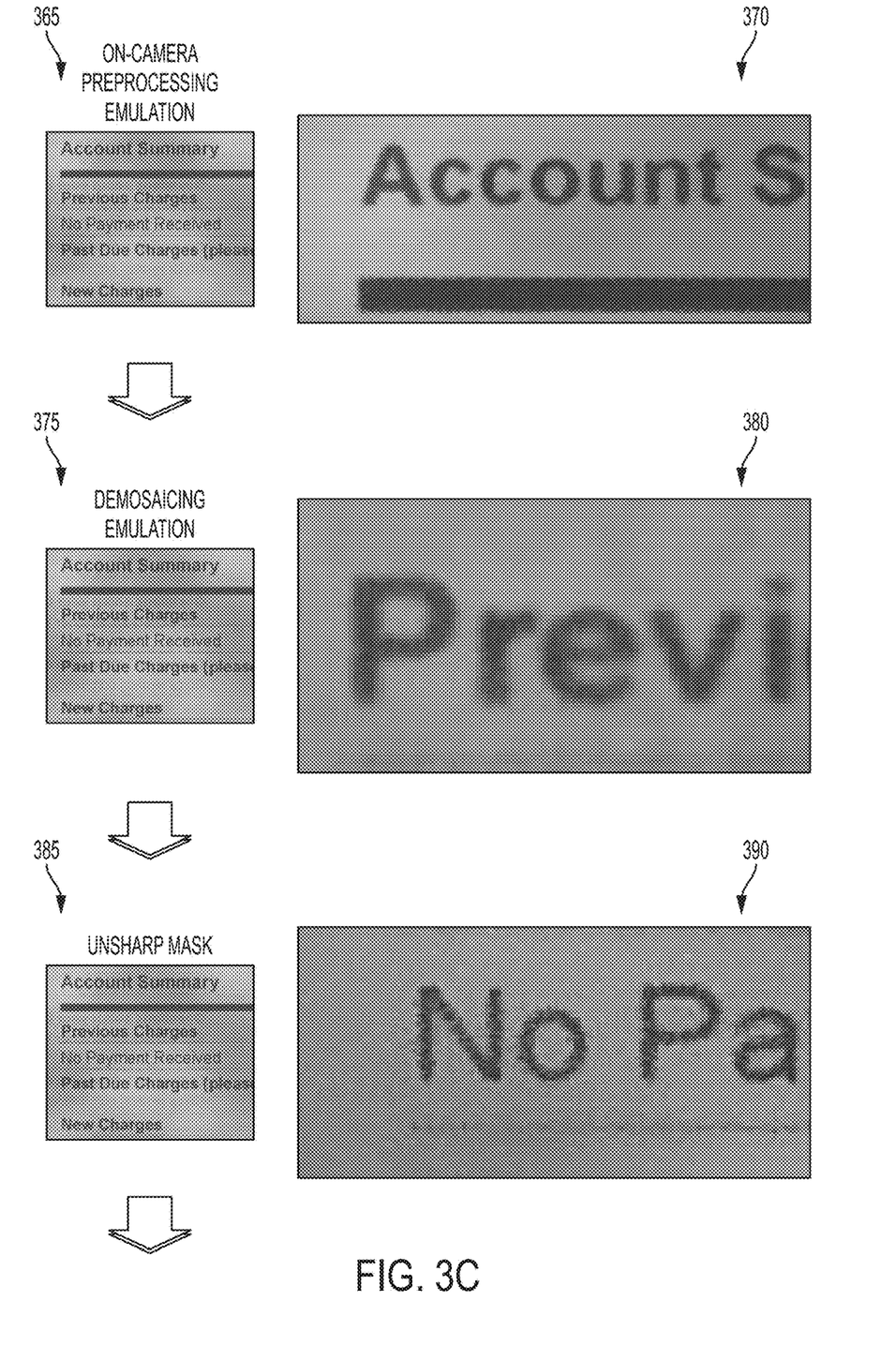

At block 245, the computer system may simulate image pre-processing performed by the image acquiring camera, e.g., by applying a sigma filter to at least a subset of the image pixels. As schematically illustrated by FIGS. 3B-3C, the emulated image pre-processing operation 365 of the input image 360 produces the output image 370.

At block 250, the computer system may simulate image de-mosaicing, which is a process of reconstructing a full color image from the incomplete color samples produced by an image sensor overlaid with a color filter array (CFA). In certain implementations, the image de-mosaicing may involve applying Gaussian blur with a pre-defined or dynamically adjustable sigma value (e.g., 0.1, 0.2, 0.3 or other value). Besides, the image de-mosaicing may further involve applying light Gaussian smoothing to the image. The Gaussian smoothing operator is a two-dimensional convolution operator which may be utilized to blur images and remove detail and noise. As schematically illustrated by FIG. 3C, operation 375 of de-mosaicing the input image 370 produces the output image 380.

At block 255, the computer system may perform un-sharp masking of at least a subset of the image pixels, which is an image processing technique utilizing a blurred, or "un-sharp", negative image to create a mask of the original image. The un-sharped mask is then combined with the positive (original) image, creating an image that is less blurry than the original. The un-sharp mask may be represented by a linear or nonlinear filter which amplifies high-frequency components of the input signal. In certain implementations, the computer system may emulate an un-sharping operation performed by a particular camera model by applying un-sharp mask parameter values which are implemented by the camera. As schematically illustrated by FIG. 3C, the operation 385 of un-sharping the input image 380 produces the output image 390.

Figure 3D:
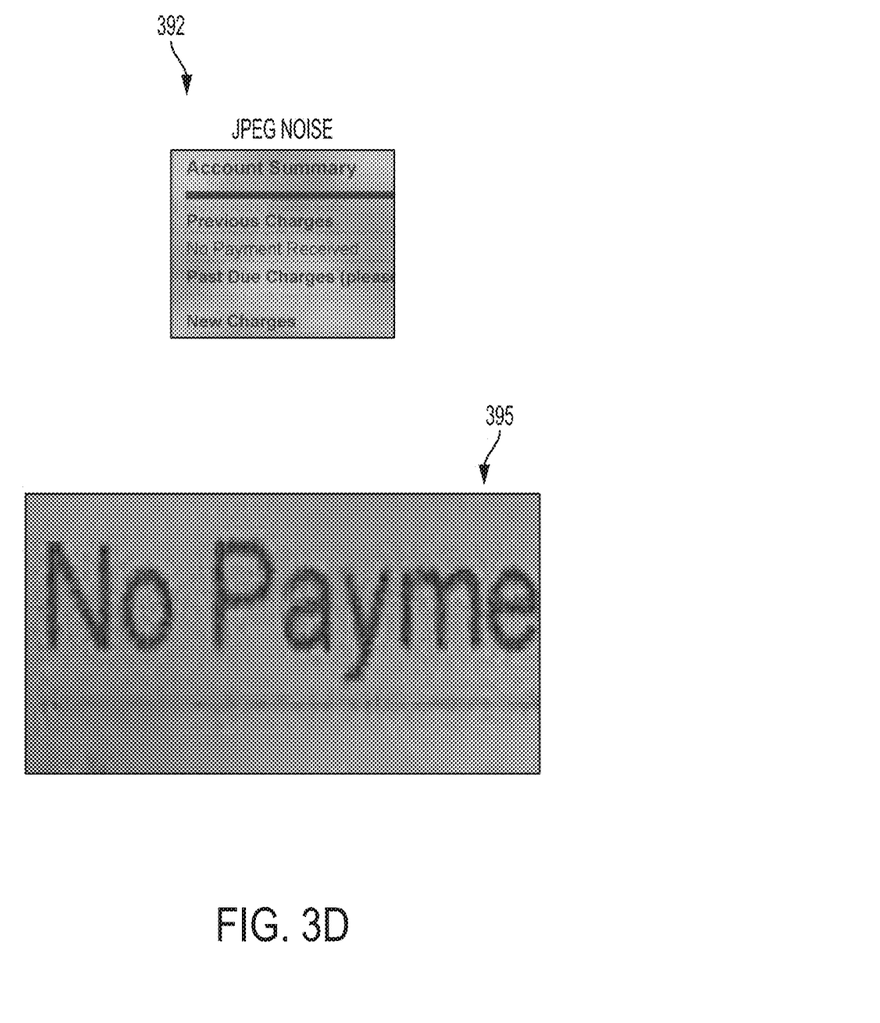

At block 260, the computer system may introduce JPEG noise, i.e., random variations of brightness or color information. The noise may be introduced, e.g., by saving the image in JPEG format of a pre-defined or dynamically adjusted quality (e.g., selected from the range 2-80) and subsequent decompressing of the saved JPEG image. As schematically illustrated by FIGS. 3C-3D, operation 392 of introducing JPEG noise into the input image 390 produces the output image 395.

The initial set of images may be processed by one or more of the above-referenced image processing operations while varying the operation parameters, thus producing an augmented set of images. The resulting set may be further augmented by rotating the imaged objects by a pre-defined or dynamically adjustable angle (e.g., selected from the range of 10-15°) or scaling a given image to produce two or more images of different sizes.

Thus, the image processing operations described herein above with reference to blocks 225-260 yield an augmented set of images of indicia-bearing objects. Pairs of images, in which one image is drawn from the initial set of images and another image is drawn from the augmented set of images, may be utilized for subsequent training of convolutional neural networks employed for correcting various image defects, e.g., neural networks which may be employed for image binarization and correcting the image blur and/or shadow and highlight enhancement, as described in more detail herein below with reference to blocks 270-275. In various implementations, various other neural networks may be trained on the datasets comprising pairs of images, in which one image is drawn from the initial set of images and another image is drawn from the augmented set of images. Furthermore, at least some of the operations described herein below with references to blocks 270-275 may be omitted; the order of the image processing operations described herein below with references to blocks 270-275 may be varied.

A convolutional neural network is a computational model based on a multi-staged algorithm that applies a set of pre-defined functional transformations to a plurality of inputs (e.g., image pixels) and then utilizes the transformed data to perform pattern recognition. A convolutional neural network may be implemented as a feed-forward artificial neural network in which the connectivity pattern between its neurons is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. Neurons from adjacent layers are connected by weighted edges. The edge weights and/or other network parameters are defined at the network training stage based on the training dataset.

In an illustrative example, training the network involves activating the convolutional neural network for every input in the training dataset. A value of a pre-defined loss function is computed based on the observed output of the convolutional neural network and the desired output specified by the training data set, and the error is propagated back to the previous layers of the convolutional neural network, in which the weights and/or other network parameters are adjusted accordingly. This process may be repeated until the value of the loss function falls below a predetermined threshold.

Accordingly, at block 265, the computer system may generate a training dataset comprising a plurality of pairs of images, such that each pair of images includes an image selected from the initial set of images and an image selected from the augmented set of images.

At block 270, the computer system may utilize the pairs of images drawn from the initial set of images and the augmented set of images for training a U-net convolutional neural network implementing an end-to-end encoder-decoder network which may be employed for image binarization and correcting the image blur.

Figure 4:
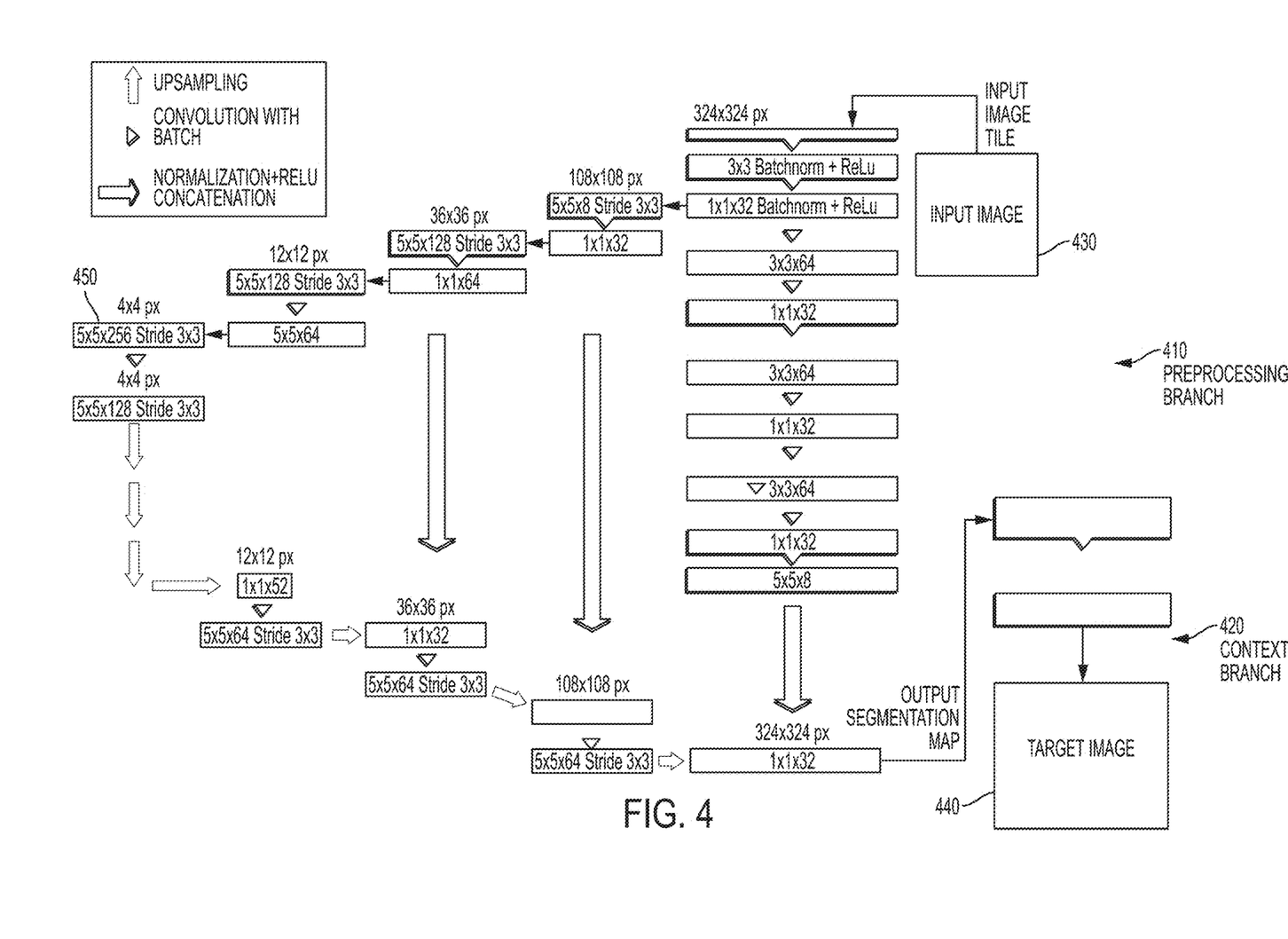
FIG. 4 schematically illustrates an example structure of a convolutional neural network which may be employed for image binarization and correcting the image blur, in accordance with one or more aspects of the present disclosure.

As schematically illustrated by FIG. 4, the U-Net network 400 may include a pre-processing (left) branch 410 and a context (right) branch 420. The preprocessing branch may include a set of convolution filters performing local transformations of the images. The context branch may include multiple convolution layers which reduce the input image 430 by a pre-defined or dynamically adjustable scaling factor (e.g., 3 times) and a corresponding number of trans-convolution layers for enlarging the image by the same scaling factor, thus effectively reversing the effect of the preceding image reduction operation. A concatenation layer may be located between the convolution and trans-convolution layers, thus preventing the local image information from being lost by the trans-convolution layers. In an illustrative example, the concatenation layer may be represented by a residual neural network which emulates the functioning of pyramidal cells in the cerebral cortex by utilizing skip connections as shortcuts to skip one or more layers. A skip connection may be associated with a skip weight learnable during the network training stage. The outputs of the preprocessing branch and the context branch are concatenated, and the concatenated data is fed to one or more convolution layers, the output of which produces the output image 440 which is substantially the same as the input image.

Training the U-Net network may be perform using the hinge loss function, which, for an intended output t=±2 and a classifier score y, defines the hinge loss of the prediction y as l (y)=max (0, 2−t·y). In certain implementations, the network training may be performed with relatively small values of the learning rate (which is a hyper-parameter of the training method which determines the rate of the gradient updates following the gradient direction. In certain implementations, the learning rate may be dynamically adjusted (decreased) over time, thus allowing for fine-tuning of the network parameters once an initial working set of network parameters is determined.

At block 275, the computer system may utilize the pairs of images drawn from the initial set of images and the augmented set of images for training a dilated convolutional neural network which may be employed for correcting the image exposure by shadow and highlight enhancement. In an illustrative example, the dilated convolutional neural network may implement a dilated convolution operator, which may be described as follows:

$$(F *_l k)(p) = \sum_{s+lt=p} F(s)k(t)$$

wherein k is a discrete filter of a pre-defined size, and *l is an l-dilated convolution.

Dilation operation essentially performs exponential expansion of the receptive field of the convolution layer without loss of resolution or coverage.

Figure 5:
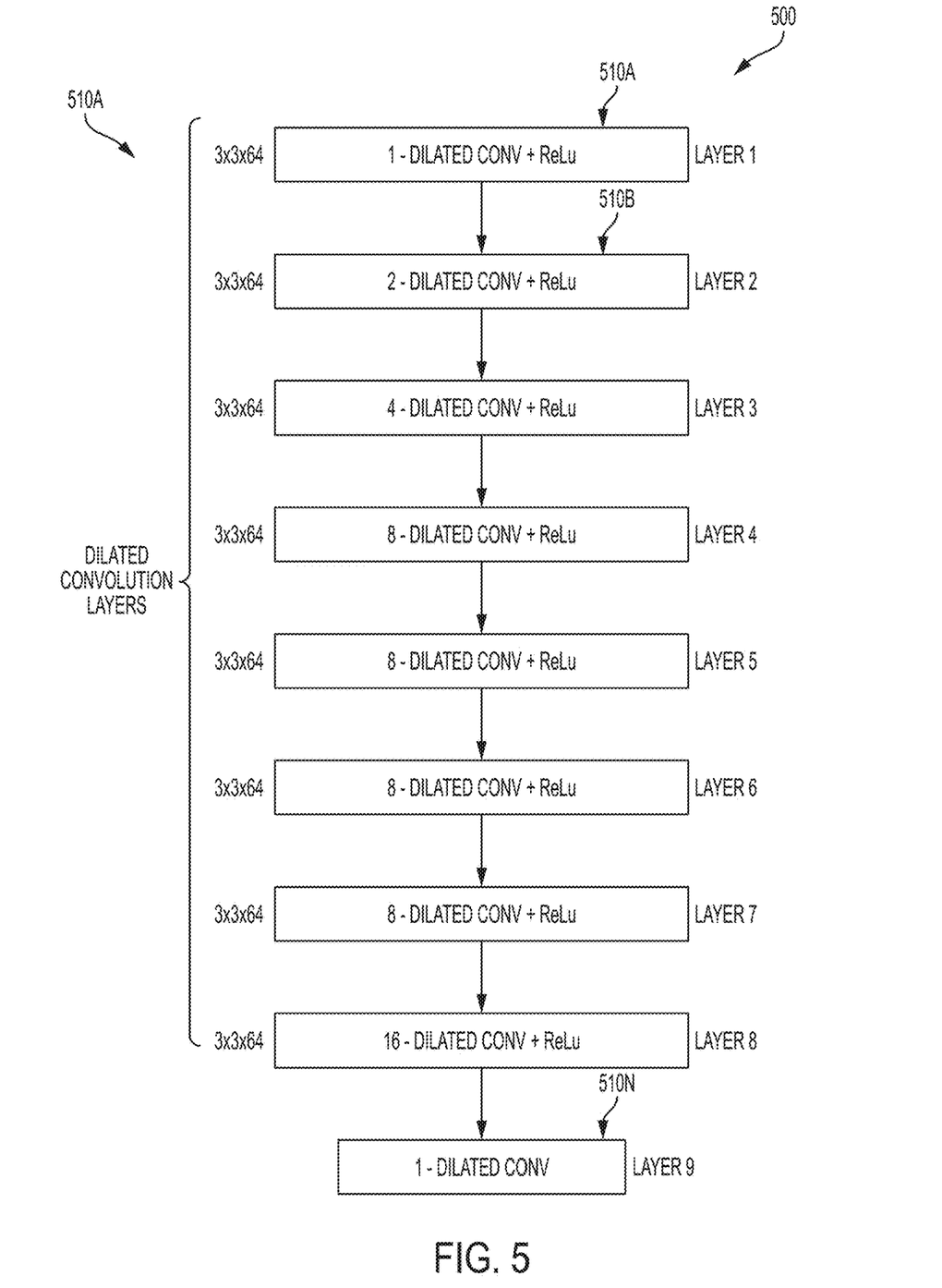
FIG. 5 schematically illustrates an example structure of a dilated convolution network which may be employed for shadow and highlight enhancement, in accordance with one or more aspects of the present disclosure.

FIG. 5 schematically illustrates an example structure of a dilated convolution network which may be employed for shadow and highlight enhancement, in accordance with one or more aspects of the present disclosure. As schematically illustrated by FIG. 5, the dilated convolution network 500 may include multiple convolution layers 510A-510N, which may implement dilated convolution operators with various values of the dilation parameter l (e.g., 1, 2, 4, 8, 8, 8, 8, 16).

In an illustrative example, the dilated convolution network may be trained using the Adam optimization algorithm, which is an extension to stochastic gradient descent methods, such as L2 loss Adam Optimizer. The training process may involve iteratively updating network weights and/or other network parameters based on the training data. In certain implementations, the network training may be performed with relatively small values of the learning rate. The training method may maintain a per-parameter learning rate that improves performance on problems with sparse gradients. The per-parameter training rate may be based on the second moments of the gradients (the uncentered variance), e.g., by calculating an exponential moving average of the gradient and the squared gradient, and the parameters which control the decay rates of these moving averages.

At block 280, the convolution neural networks trained at blocks 270-275 may be employed for image pre-processing in various OCR implementations and/or other image processing applications.

In certain implementations, convolutional neural networks which are utilized for image pre-processing (such as the above-described convolutional neural networks) may be modified and employed for classifying a set of input images in order to segregate synthetic images from real photographic images. Such modified networks may be employed for determining the quality of synthetic images: if the classification accuracy does not exceed a low threshold value (which may be selected to be close to 50%), the quality of the synthetic images may be adequate for employing them for training neural networks to be employed for image processing for OCR and various other applications. Conversely, if the classification accuracy exceeds another threshold value (which may be selected to be close to 70%), the quality of the synthetic images may be inadequate for employing them for training neural networks since the synthetic images would be distinguishable from real photographic images. Thus, the convolutional neural network modified for synthetic image segregation may be employed for filtering the training datasets generated in accordance with one or more aspects of the present disclosure, thus preventing synthetic images of inadequate quality to be employed for neural network training.

Figure 6:
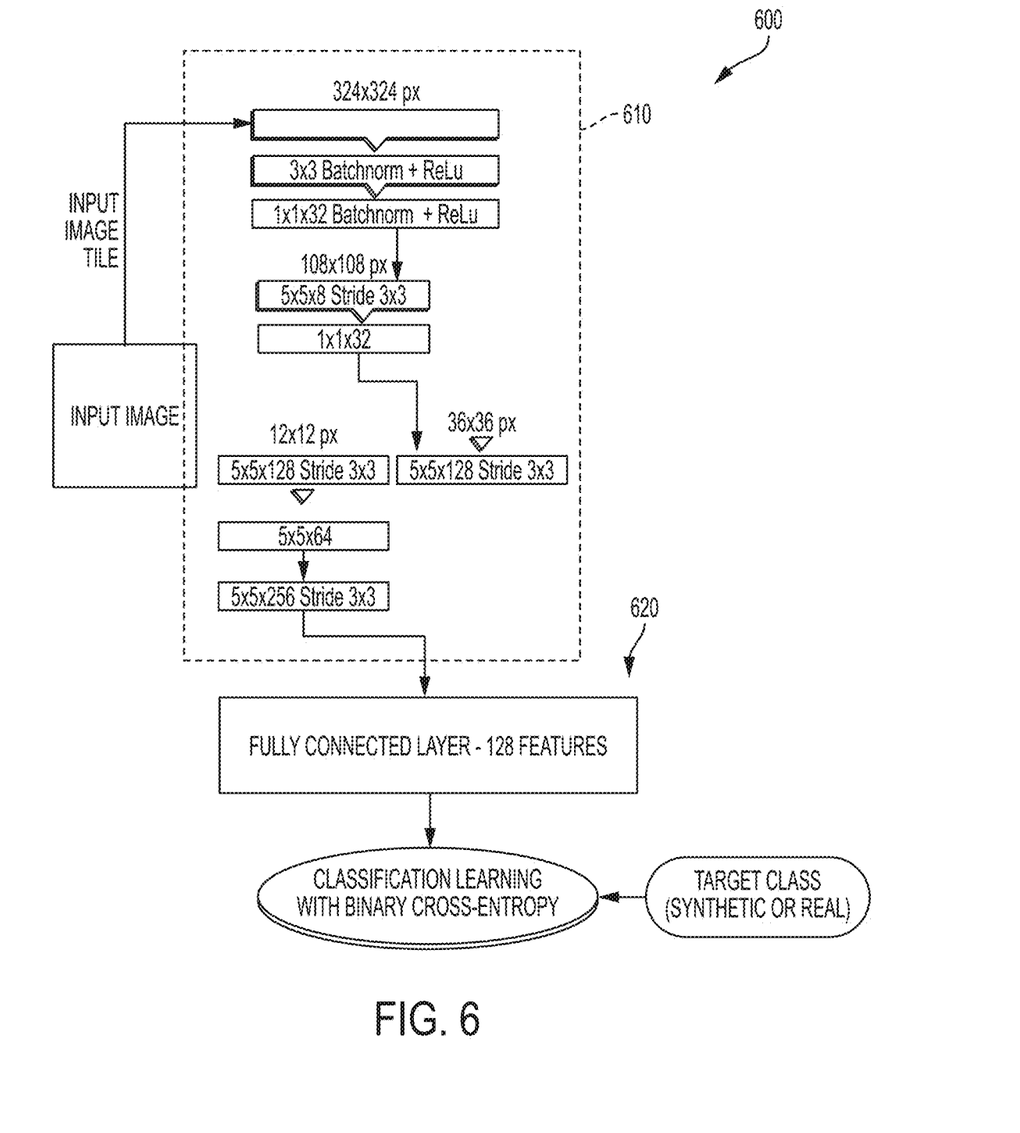
FIG. 6 schematically illustrates an example structure of a convolutional neural network which may be employed for classifying a set of input images in order to segregate synthetic images from real photographic images, in accordance with one or more aspects of the present disclosure.

In an illustrative example, the convolution neural network schematically illustrated by FIG. 4 may be modified by removing the network components following a pre-defined convolution layer (e.g., a convolution layer 450 of FIG. 4 having a pre-defined dimensions, such as 5×5×256). Thus, as schematically illustrated by FIG. 6, the modified convolutional neural network 600 would include a subset 610 of components of the initial neural network 400 between the network input and the pre-defined convolution layer (e.g., a convolution layer 450 of FIG. 4). The output of the convolution layer 450 is fed to a fully-connected layer 620, which transforms its input into a vector of a pre-defined (e.g., 128) number of features, which is classified into the specified target classes (e.g., synthetic image class and real photo image class). The convolutional neural network 600 may be trained using a binary cross entropy-based loss function.

Thus, the present disclosure describes systems and methods for generating photorealistic images, which involve emulating the image acquisition process by rendering images of textual strings and subsequent processing of the generated images in order to introduce various imperfections and/or distortions (defocusing, blur, glare, etc.) which are usually found in photographically acquired images. Utilizing the synthetic photorealistic images produced by the systems and methods of the present disclosure for training image processing neural networks results in significant improvements in the image quality, thus improving the overall efficiency of the optical character recognition (OCR) process which extracts textual information from the images.

Figure 7:
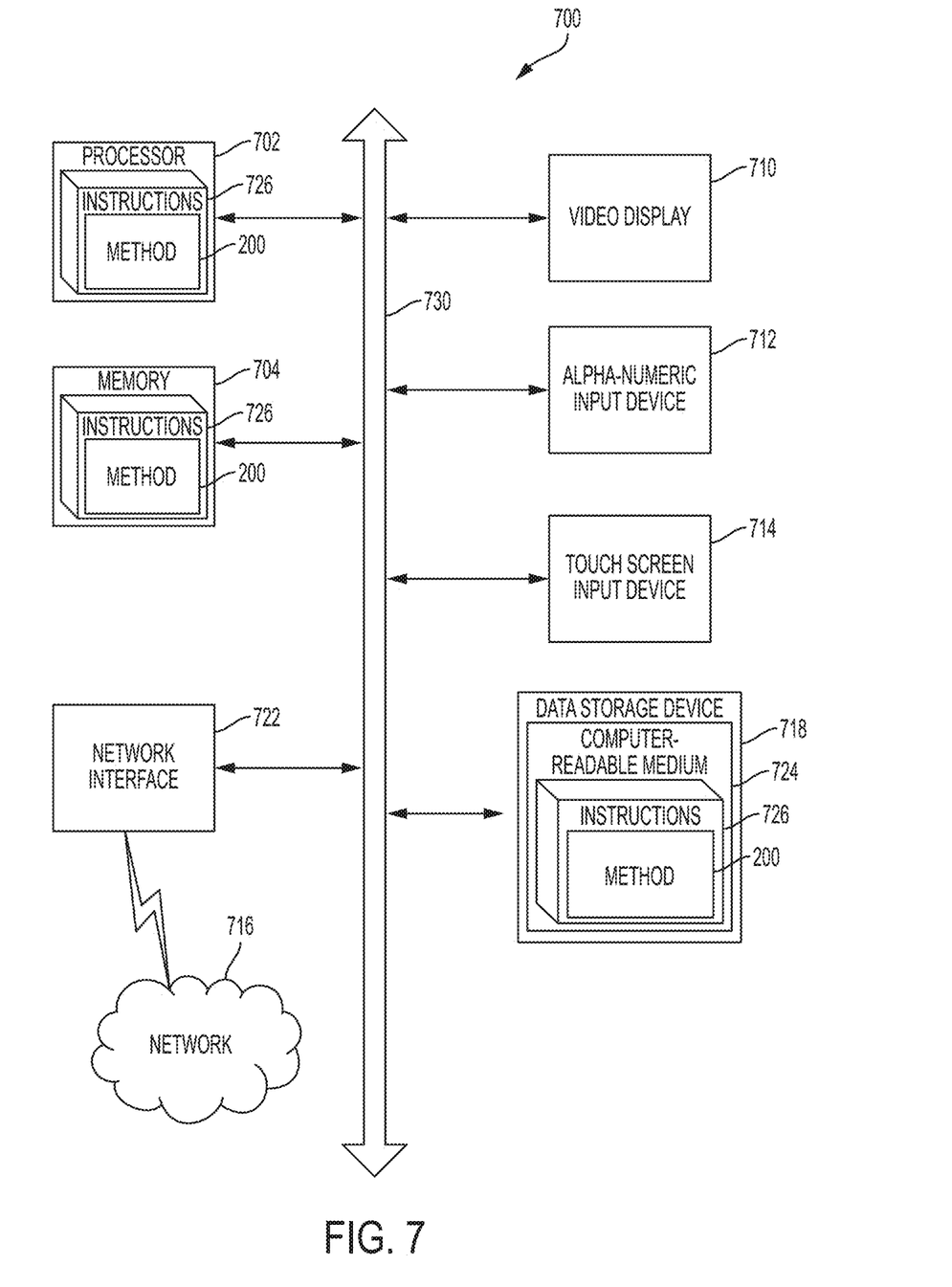
FIG. 7 depicts a component diagram of an example computer system which may be employed for implementing the methods described herein.

FIG. 7 depicts a component diagram of an example computer system which may be employed for implementing the methods described herein. The computer system 700 may be connected to other computer system in a LAN, an intranet, an extranet, or the Internet. The computer system 700 may operate in the capacity of a server or a client computer system in client-server network environment, or as a peer computer system in a peer-to-peer (or distributed) network environment. The computer system 700 may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methods described herein.

Exemplary computer system 700 includes a processor 702, a main memory 704 (e.g., read-only memory (ROM) or dynamic random access memory (DRAM)), and a data storage device 718, which communicate with each other via a bus 730.

Processor 702 may be represented by one or more general-purpose processing devices such as a microprocessor, central processing unit, or the like. More particularly, processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute instructions 726 for performing the methods described herein.

Computer system 700 may further include a network interface device 722, a video display unit 710, a character input device 712 (e.g., a keyboard), and a touch screen input device 714.

Data storage device 718 may include a computer-readable storage medium 724 on which is stored one or more sets of instructions 726 embodying any one or more of the methods or functions described herein. Instructions 726 may also reside, completely or at least partially, within main memory 704 and/or within processor 702 during execution thereof by computer system 700, main memory 704 and processor 702 also constituting computer-readable storage media. Instructions 726 may further be transmitted or received over network 716 via network interface device 722.

In certain implementations, instructions 726 may include instructions of method 200 of training image processing neural networks by synthetic photorealistic indicia-bearing images, implemented in accordance with one or more aspects of the present disclosure. While computer-readable storage medium 724 is shown in the example of FIG. 7 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methods of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   generating, by a computer system, an initial set of images, wherein each image of the initial set of images comprises a rendering of a text string;
   producing an augmented set of images by processing the initial set of images to introduce, into each image of the initial set of images, at least one simulated image defect, by applying, to at least a subset of pixels of the image, a simulated digital noise;

generating a training dataset comprising a plurality of pairs of images, wherein each pair of images comprises a first image selected from the initial set of images and a second image selected from the augmented set of images; and training, using the training dataset, a convolutional neural network for image processing.

2. The method of claim 1, wherein processing the initial set of images further comprises:

superimposing, on a generated image, a transparent image of a pre-defined or randomly generated text.

3. The method of claim 1, wherein processing the initial set of images further comprises:

de-contrasting a generated image to reduce a maximum difference in luminance of pixels of the generated image by a pre-defined value.

4. The method of claim 1, wherein processing the initial set of images further comprises:

simulating an additional light source in a scene of a generated image by additively applying, to at least a subset of pixels of the generated image, low frequency Gaussian noise of a low amplitude.

5. The method of claim 1, wherein processing the initial set of images further comprises:

de-focusing a generated image by applying, to at least a subset of pixels of a generated image, Gaussian blur.

6. The method of claim 1, wherein processing the initial set of images further comprises:

simulating movement of imaged objects in a generated image by superimposing a motion blur on the generated image.

7. The method of claim 1, wherein processing the initial set of images further comprises:

simulating camera pre-processing of a generated image by applying a filter to at least a subset of pixels of the generated image.

8. The method of claim 1, wherein processing the initial set of images further comprises:

simulating de-mosaicing of a generated image by applying Gaussian blur to at least a subset of pixels of the generated image.

9. The method of claim 1, wherein the convolutional neural network comprises multiple convolution layers which implement dilated convolution operators with various dilation parameter values.

10. The method of claim 9, wherein training the convolutional neural network further comprises:

determining a per-parameter training rate by calculating an exponential moving average of a gradient and a squared gradient of an input signal.

11. The method of claim 1, further comprising:

utilizing the convolution neural network for image pre-processing for an optical character recognition (OCR) application.

12. The method of claim 1, further comprising:

generating a classification convolutional neural network for classifying a set of input images into a first class comprising synthetic images and a second class comprising real photo images.

13. The method of claim 12, wherein generating a classification convolutional neural network comprises modifying a convolution neural network utilized for image pre-processing.

14. The method of claim 12, further comprising:

utilizing the classification convolutional neural network for filtering the training data set.

15. A system, comprising:

a memory;

a processor, coupled to the memory, the processor configured to:

generate an initial set of images, wherein each image of the initial set of images comprises a rendering of a text string;

produce an augmented set of images by processing the initial set of images to introduce, into each image of the initial set of images, at least one simulated image defect;

generate a training dataset comprising a plurality of pairs of images, wherein each pair of images comprises a first image selected from the initial set of images and a second image selected from the augmented set of images; and train, using the training dataset, a convolutional neural network for image processing, wherein the convolutional neural network comprises a preprocessing branch including a set of convolution filters performing local transformations of an input image and a context branch including multiple convolution layers which reduce the input image by a scaling factor and multiple trans-convolution layers for enlarging the image by the scaling factor.

16. A computer-readable non-transitory storage medium comprising executable instructions that, when executed by a processing device, cause the processing device to:

generate an initial set of images, wherein each image of the initial set of images comprises a rendering of a text string;

produce an augmented set of images by processing the initial set of images to introduce, into each image of the initial set of image, at least one simulated image defect;

generate a training dataset comprising a plurality of pairs of images, wherein each pair of images comprises a first image selected from the initial set of images and a second image selected from the augmented set of images; and train, using the training dataset, a convolutional neural network for image processing, wherein training the convolutional neural network is performed using a hinge loss function.

17. The computer-readable non-transitory storage medium of claim 16, further comprising executable instructions causing the processing device to:

generate a classification convolutional neural network for classifying a set of input images into a first class comprising synthetic images and a second class comprising real photo images.

* * * * *